United States Patent [19]

Louis

[11] 4,400,935
[45] Aug. 30, 1983

[54] ENGINE SPEED CONTROL

[75] Inventor: Joseph E. Louis, Ames, Iowa

[73] Assignee: Sundstrand Corporation, Rockford, Ill.

[21] Appl. No.: 117,795

[22] Filed: Jan. 28, 1980

[51] Int. Cl.³ ............................................ F16H 39/46
[52] U.S. Cl. ...................................... 60/431; 60/443;
60/444; 60/445; 180/6.48; 180/306; 180/307;
417/34
[58] Field of Search ............... 417/34; 60/431, 423,
60/428, 420, 443, 444; 180/307, 308, 306, 6.48

[56] References Cited

U.S. PATENT DOCUMENTS

| | | | |
|---|---|---|---|
| 2,516,662 | 7/1950 | Vickers et al. | 60/444 |
| 2,690,712 | 10/1954 | Foote | 103/16 |
| 2,916,880 | 12/1959 | Hann | 60/53 |
| 2,942,421 | 6/1960 | Hann et al. | 60/423 |
| 3,058,297 | 10/1962 | Tolley | 60/443 X |
| 3,167,907 | 2/1965 | Kempson | 60/431 |
| 3,302,390 | 2/1967 | Christenson et al. | 60/431 |
| 3,411,297 | 11/1968 | Hann | 60/53 |
| 3,447,556 | 6/1969 | Howeth | 417/34 X |
| 3,595,343 | 7/1971 | Williamson | 187/9 |
| 3,633,359 | 1/1972 | Worn | 60/19 |
| 3,676,017 | 7/1972 | Castleberry | 417/34 |
| 3,744,517 | 7/1973 | Budzich | 60/452 X |
| 3,795,109 | 3/1974 | Bojas et al. | 60/445 |
| 3,812,676 | 5/1974 | Smith | 60/431 |
| 3,827,522 | 8/1974 | Krause | 180/306 |
| 3,898,806 | 8/1975 | Press | 60/428 X |
| 3,943,712 | 3/1976 | Stuhr | 60/431 X |
| 3,946,560 | 3/1976 | MacIntosh et al. | 60/428 |
| 3,973,472 | 8/1976 | Russell, Jr. | 92/13 |
| 4,124,095 | 11/1978 | Ezure | 187/9 |
| 4,240,515 | 12/1980 | Kirkwood | 180/308 |

FOREIGN PATENT DOCUMENTS 2751663  5/1978  Fed. Rep. of Germany ........ 60/431

*Primary Examiner*—George L. Walton
*Attorney, Agent, or Firm*—Wood, Dalton, Phillips, Mason & Rowe

[57] ABSTRACT

An engine speed control for a variable speed engine wherein the engine can have a set speed to operate at a relatively low working speed or at an idle speed and which is adjustable to increase engine speed. The engine drives plural pumps and a control circuit is responsive to a certain flow rate from either of said pumps to increase the speed of the engine to provide for additional flow from the pumps. In a hydrostatic transmission as usable in the drive of a vehicle, there are a pair of fluid translating devices, in the form of a pump and a motor, with at least one of the devices being of variable displacement and having a displacement control responsive to a speed control signal. In such a system, the engine which powers the hydrostatic transmission is set at a desired speed of operation below maximum speed and is adjusted in response to the speed control signal for increase in said engine speed when the speed control signal exceeds a predetermined level. The control circuit also provides for destroking of the motor at maximum displacement of the pump when both are of variable displacement.

4 Claims, 4 Drawing Figures

ENGINE SPEED CONTROL

BACKGROUND OF THE INVENTION

This invention pertains to an engine speed control for a variable speed engine which control is responsive to a demand for increased flow from a pump of a hydrostatic transmission or to either of a plurality of pumps with at least one of the pumps being usable in a hydrostatic transmission as for driving a vehicle and the other pump being a source of fluid for an implement circuit associated with the vehicle.

Many vehicles, particularly off-the-road vehicles, such as earth working equipment, which also have an implement circuit, now use one or more hydrostatic transmissions for driving the traction wheels or tracks of the vehicle. Frequently, the prime mover engine of such vehicle is set to operate at a certain speed and continues to operate at that speed under normal conditions. The vehicle speed under normal conditions can be controlled by controlling the displacement of one of the components of the hydrostatic transmission without adjusting engine speed. An example of such utilization of a hydrostatic transmission is shown in Donald J. MacIntosh et al. U.S. Pat. No. 3,946,560, owned by the assignee of this application, wherein a pair of hydrostatic transmissions are disclosed as usable in a dual path transmission. The pair of hydrostatic transmissions are associated with traction means, such as tracks positioned at opposite sides of the vehicle. The MacIntosh et al. patent discloses that a wide range of vehicle speed can be established by controlling the displacement of the components of the hydrostatic transmissions.

Better fuel economy, as well as lower noise of operation and longer component life, can be achieved if the prime mover engine normally operates at a set speed which is a relatively low working engine speed less than maximum speed. It is known to operate an engine at an idle speed and cause the speed of the engine to increase when there is flow demand from an engine-driven pump. An example of this is a vehicle used by utility companies wherein the vehicle may be parked and the engine idling. When a personnel lift or other device is manipulated, a system causes an increase in the speed of the vehicle engine to provide more flow from a pump supplying fluid to the fluid circuit. Such systems do not relate to the control of engine speed responsive to flow demands of a hydrostatic transmission used in the drive of the vehicle, nor to control of engine speed when any one of a plurality of pumps driven by the engine are required to provide an output flow beyond that which the pump can provide at the lower engine speed.

SUMMARY OF THE INVENTION

A primary feature of the invention disclosed herein is to provide an engine speed control for an engine which normally operates at a relatively low working speed for driving a pump of a hydrostatic transmission or a plurality of pumps and which increases engine speed when any one of said pumps must provide flow beyond that which can be delivered at the relatively low working speed of the engine.

An added feature of the invention is the destroking of a variable displacement motor of the hydrostatic transmission after the pump of variable displacement has reached maximum stroke.

In carrying out the foregoing features of the invention, an engine has an adjustable throttle or governor which can be set to provide a relatively low working speed or idle speed for the engine. A control motor is operable in response to a control signal for adjusting the throttle or governor to increase engine speed. In one embodiment of the invention, the engine drives a variable displacement pump of a hydrostatic transmission and also drives a pump for supplying fluid to an implement circuit. A control signal is delivered to the control motor as the variable displacement pump approaches maximum stroke and therefore maximum flow at the low working speed of the engine to cause an increase in engine speed and increased flow from the pump. This control signal is also applied to a control servo associated with a variable displacement motor of the hydrostatic transmission to cause destroking thereof as the pump approaches maximum stroke. Additionally, a control signal can be generated to increase engine speed responsive to the need for added flow from the pump supplying the implement circuit whereby either of the pumps driven by the engine can cause increased engine speed. With this system, engine speed increases only when required either by a demanded vehicle speed or by operation of an implement in the implement circuit.

In another embodiment of the invention, the hydrostatic transmission has the displacement of the variable displacement pump set by a speed control signal in a speed control circuit and with this speed control signal also being delivered to the control motor associated with the speed-adjusting mechanism of the engine whereby when the speed control signal exceeds a predetermined level, the speed of the engine may be increased beyond that which has been previously set by an operator, when the previously set speed is lower than the maximum engine speed. In this embodiment, the engine speed can also be subject to flow demand in an implement circuit. Destroking of the variable displacement motor of the hydrostatic transmission as the pump reaches maximum displacement is accomplished through application of the speed control signal to the motor control as well as to the pump control.

In both embodiments of the invention, the control circuit including the control motor for the adjustment of engine speed has a pair of branch lines arranged in parallel with one branch line responding to the displacement of one pump and the other branch line responding to the flow demand of the implement circuit pump. Each of the branch lines includes a check valve whereby a control signal existing in one branch line is blocked from the other branch line. The control circuit includes a flow restricted path to tank whereby a control signal may be gradually dissipated.

DESCRIPTION OF THE PREFERRED EMBODIMENTS

Figure 1:
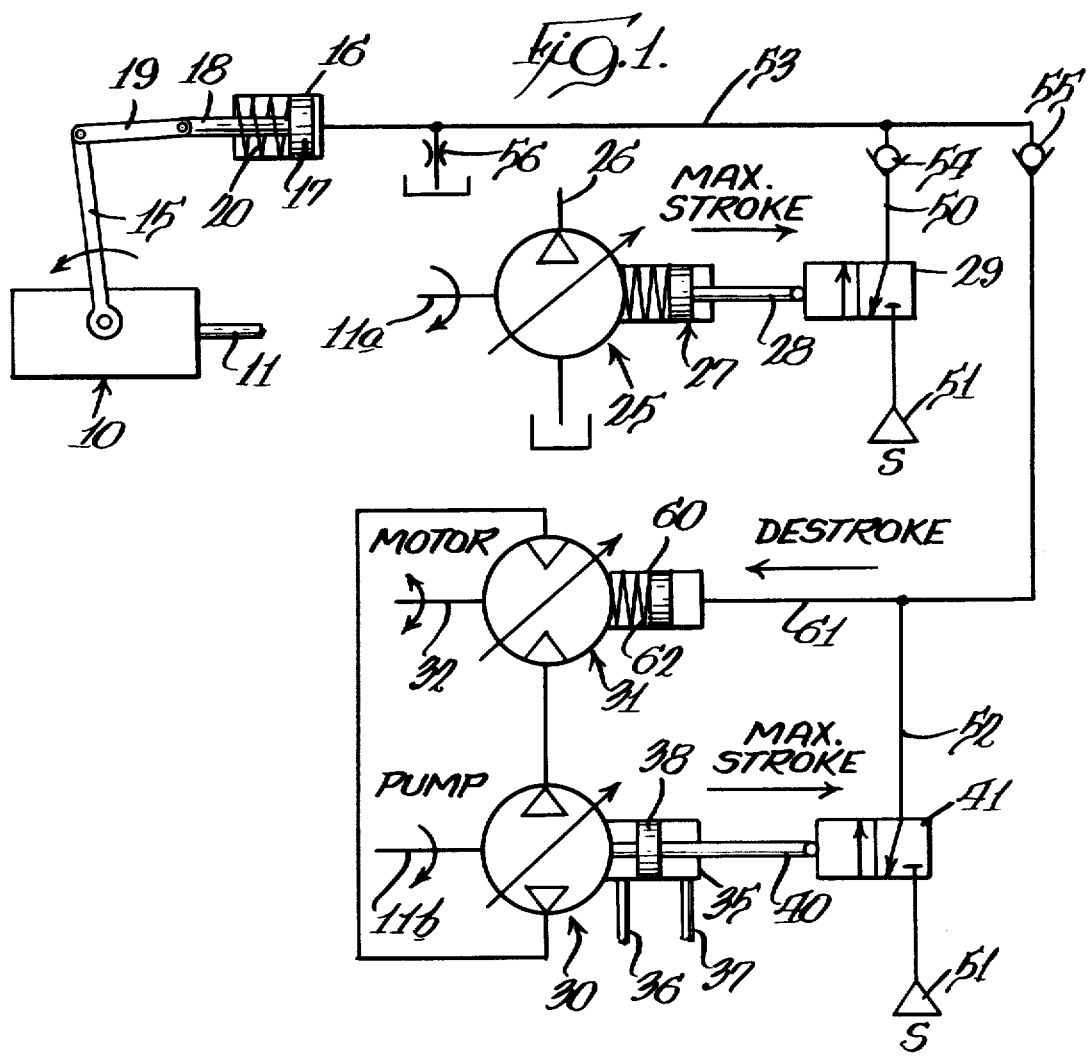
FIG. 1 is a schematic view of one embodiment of the engine speed control.

In the embodiment of FIG. 1, an engine, indicated generally at 10, has an output shaft 11 which connects to a pair of input shafts 11a and 11b. The engine has a conventional throttle which is under the control of a throttle lever 15. The throttle lever 15 is shown in a position which sets a relatively low working speed for the engine. The throttle lever 15 can be moved in a counterclockwise direction under the control of a control motor or servo 16 having a piston 17 and piston rod 18 with the latter being connected to the throttle lever 15 by an intermediate pivotal link 19. The control motor includes a spring 20 which urges the throttle lever 15 to the set speed position. Applying a control signal to the control motor and, more particularly, a fluid pressure signal thereto of a magnitude to overcome the force of the spring 20 causes the control motor to move the throttle lever 15 in a counterclockwise direction to increase engine speed.

The input shaft 11a, driven by the engine 10, is an input shaft for a pump, indicated generally at 25, which supplies fluid through a line 26 of an implement circuit to one or more implements carried by a vehicle having the disclosed system. The pump 25 is shown as a variable displacement pump having a displacement control, indicated generally at 27, and from which a rod 28 extends into association with a normally-closed control valve 29.

The input shaft 11b, driven by the engine, drives a pump, indicated generally at 30, which is a variable displacement unit and a component of a hydrostatic transmission having a second variable displacement unit, indicated generally at 31, and which operates as a motor. The motor 31 has an output shaft 32 which can connect to the ground-engaging traction means of a vehicle. The pump 30 has a displacement control servo 35 which can be supplied with pressure fluid through either of lines 36 and 37 for acting on a piston 38 within the control servo for setting a desired displacement of the pump 30. A rod 40 extends from the displacement control and is associated with a normally-closed control valve 41 for positioning thereof.

A control circuit for causing an engine speed above the relatively low set speed includes the control motor 16 for the throttle lever 15 and the control valves 29 and 41. The valve 29 is connected in a first branch line 50 of the control circuit and is supplied with pressure fluid from a control pressure source 51. The control valve 41 is in a second branch line 52 of the control circuit with the branch lines being in parallel. The branch line 52 is connected with the pressure source 51. Each of the branch lines 50 and 52 connects into a line 53 of the control circuit which extends to the control motor 16. Each branch line has a check valve, as indicated at 54 and 55, which immunizes the branch lines one from the other. The line 53 of the control circuit connects to tank through an orifice 56 to provide a restricted flow path from the control circuit for gradual dissipation of a control signal after the control valves 29 and 41 are closed.

In operation of the embodiment shown in FIG. 1, the control motor 16 is associated with the throttle lever 15 whereby in a normal inactive position of the control motor, the throttle lever sets a relatively low working speed or idle speed for the engine which drives the pumps 25 and 30 to provide for certain flow therefrom, dependent upon the displacement setting thereof. When an implement in the implement circuit 16 is operated and the pump 25 has reached maximum displacement, the control valve 29 is shifted from the position shown in FIG. 1 to a position wherein the source 51 of pressure fluid is opened to the control motor 16 through the check valve 54 whereby a control signal is applied to the control motor to cause an increase in engine speed. When the displacement of the pump 25 decreases and the control valve 29 moves back to the closed position, shown in FIG. 1, the control signal can gradually dissipate through the orifice 56 whereby the engine returns to the lower set speed.

Referring to the hydrostatic transmission, as the pump 30 approaches maximum displacement, the control valve 41 is shifted through movement of the rod 40 to connect the source 51 of control pressure to the line 53 of the control circuit for application of a control signal to the control motor 16. When the displacement of the pump 30 is reduced beyond a predetermined level, the control valve 41 will return to the closed position, shown in FIG. 1, to discontinue the control signal and, thereafter, this signal will gradually dissipate through the orifice 56.

An added feature of the embodiment shown in FIG. 1 is in utilization of the control signal generated through the control valve 41 to cause a destroking of the variable displacement motor 31 as the pump approaches maximum displacement. This is accomplished by the control signal being directed to a conventional type control servo 60 for the motor 31 through a line 61 connected to the branch line 52 and acting against a spring 62 to destroke the motor, with the level of the control signal determining the extent of destroking of the motor.

With the system shown in FIG. 1, the engine 10 can operate at a relatively low working speed to supply certain speed demands of a vehicle when the hydrostatic transmission is used in the drive of the vehicle as well as the demands of the implement circuit and if the flow demand in either the hydrostatic transmission or the implement circuit exceeds that available at maximum displacement of either pump, then a control signal is applied to the control motor 16 to increase engine speed and thereby increase flow from the pumps. The increased flow from the transmission pump can cause a slight increase in vehicle speed. However, this is negligible in a low speed off-the-road vehicle. The rate of adjustment of engine speed is also controlled by the flow path to tank through the orifice 56.

Figure 2:
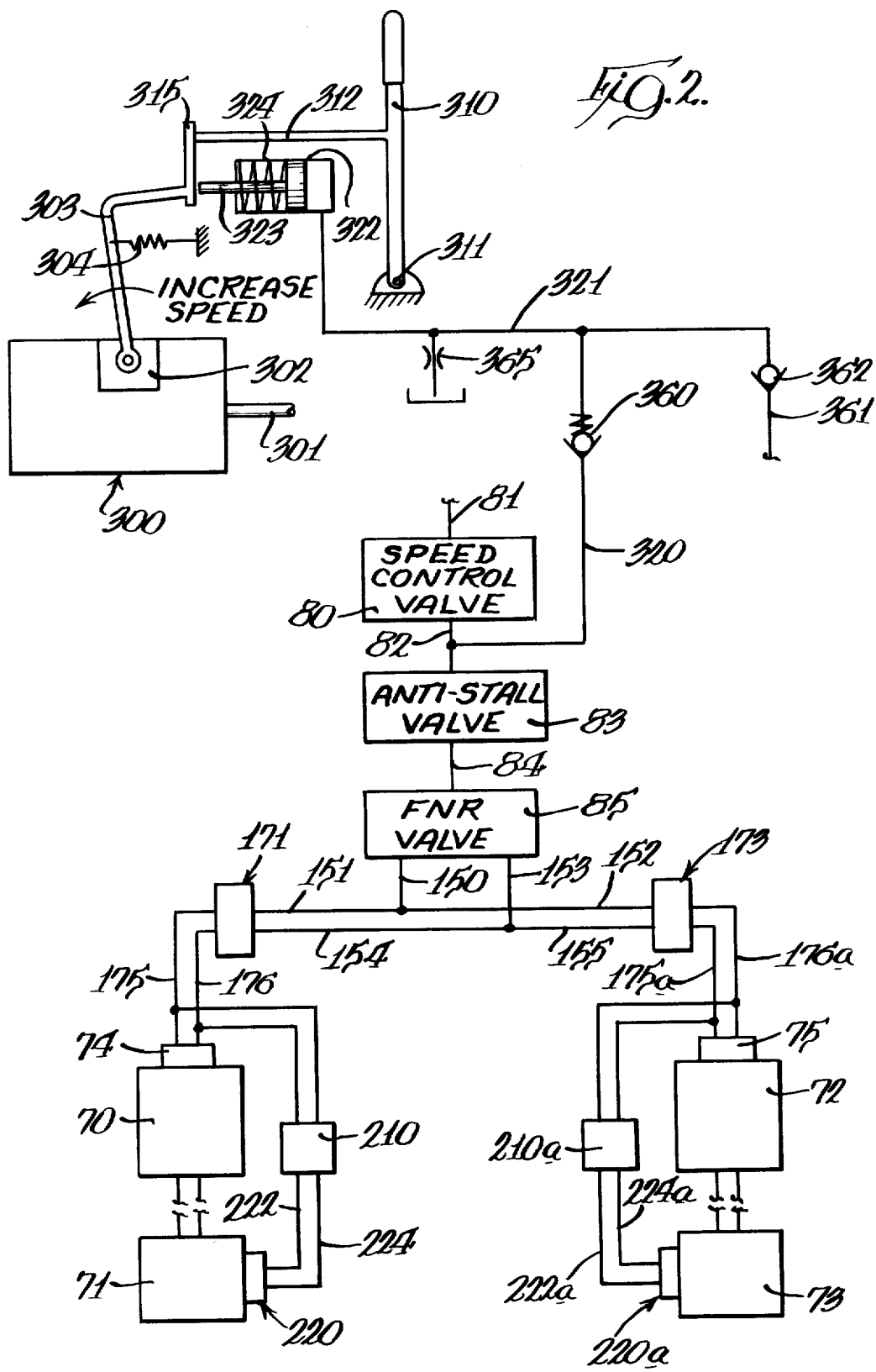
FIG. 2 is a schematic view of another embodiment of the engine speed control associated with a dual path transmission and with parts broken away.

The embodiment of FIG. 2 shows the engine speed control associated with a dual path hydrostatic transmission for imparting a drive to a vehicle, such as a crawler tractor and with the engine also driving an implement circuit pump.

The dual path transmission of FIG. 2 is a structure shown in Donald J. MacIntosh et al U.S. Pat. No. 3,946,560 and the disclosure thereof is incorporated herein by reference. The dual path hydrostatic transmission includes two distinct hydrostatic transmissions, with one transmission having the pump 70 in fluid communication with the motor 71 and the other transmission having a pump 72 in fluid communication with a motor 73. The pumps 70 and 72 correspond with the pumps 32 and 32' of the MacIntosh et al patent and the motors 71 and 73 herein correspond to the motors 33 and 33' of the patent. The pumps 70 and 72 are variable displacement pumps and each have respective control servos 74 and 75 which are responsive to a speed control signal for setting the displacement of the pumps. The speed control signal is a fluid pressure signal set by a speed control valve 80 which is connected to a source of fluid under pressure through line 81 and which has the structure of the pressure-reducing valve 125 of the MacIntosh et al patent. The speed control valve 80 receives pressure fluid at a predetermined pressure level and can reduce the pressure to a desired level for a desired vehicle speed. The speed control signal set by the speed control valve 80 is delivered by line 82 to an anti-stall valve 83 which has the structure of the horsepower control valve 140, shown in the MacIntosh et al patent, which can modify the speed control signal when necessary to avoid stalling of the prime mover engine. The speed control signal then passes through a line 84 to an F N R valve 85 which has the structure of the directional control valve 142 of the MacIntosh et al patent and which can be positioned to determine whether the hydrostatic transmissions will operate in a manner to cause forward travel of the vehicle or, alternatively, rearward travel thereof. The remainder of the structure of the disclosed dual path hydrostatic transmission is the same as the structure in the MacIntosh et al patent and the description of the structure associated with the pumps and motors generally is given the same reference numerals as those given in the MacIntosh et al patent.

The speed control signal leaves the F N R valve 85 through either of the lines 150 or 153 and is directed to the pair of steering control valves 171 and 173 and, thereafter, passes to either of lines 175 or 176 extending to the displacement control 74 for the pump 70 and to lines 175a and 176a extending to the displacement control 75 for the pump 72. Branches of these lines also extend through shuttle valves 210 and 210a with the shuttle valve 210 connecting to the lines 222 and 224 connected to a motor displacement control, indicated generally at 220. The shuttle valve 210a connects to a pair of lines 222a and 224a extending to a motor displacement control 220a.

The operation of the dual path transmission is generally summarized herein with a more detailed description of the structure and operation being given in the MacIntosh et al patent previously referred to and with the entirety thereof incorporated herein by reference. If the vehicle is to travel in a forward direction, the speed control signal is delivered to one or the other of the lines 150 or 153 and thereafter passes through the steering control valves 171 and 173 to set the displacement of the pumps and motors of the hydrostatic transmissions. A variation in the pressure level of the speed control signal will cause a corresponding variation in vehicle speed. With the delivery of a common speed control signal to both transmissions, there is theoretically a uniform output speed from both transmissions to cause straight travel of a crawler-type vehicle. If it is desired to steer the vehicle, one or the other of the steering control valves can be operated to modify the value of the speed control signal delivered to a particular transmission and thus to vary the speed thereof relative to the other with resulting steering of the vehicle. The function of the shuttle valves 210 and 210a is to always have the higher pressure in the lines 175 and 176 and 175a and 176a applied to the same side of the displacement controls for the motors whereby the displacement controlling member of the motors always adjusts in the same direction.

An engine 300 has an output shaft 301 for driving the pumps 70 and 72 of the hydrostatic transmissions and has an engine governor 302 for controlling engine speed. A lever 303 is operable to control the action of the governor and is spring-urged by a spring 304 in a direction to cause an idle speed of the engine.

Figure 3:
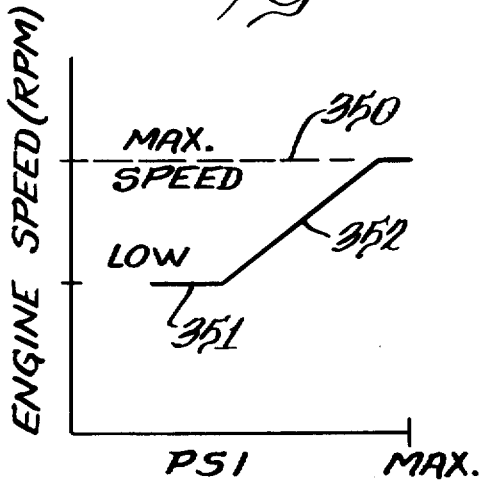
FIG. 3 is a graph showing the relation between the pressure of a control signal and an engine speed in the embodiment of FIG. 2.

An operator's handle 310 is moved about a fixed pivot 311 to control the position of the engine governor by means of a lateral extension 312 of the handle being engageable with a section 315 of the lever 303. When a demand for flow from a pump exceeds that available at a particular speed of the engine, the lever 303 is automatically moved in a counterclockwise direction to set the governor to provide an increased engine speed. This automatic engine control is controlled from the dual path hydrostatic transmission through utilization of the speed control signal set by the speed control valve 80. A fluid line 320 connects into the fluid line 82 and forms part of a control circuit having an additional line 321 which extends to a control motor 322 having the same construction as the control motor 16 of the embodiment of FIG. 1 and having a piston rod 323 which is normally urged to an inactive position by a spring 324. When the speed control signal exceeds a predetermined level, the signal acting on the control motor 322 causes extension of the rod 323 to engage the section 314 of the lever 303 and adjust the governor to increase engine speed. This relation is shown in the graph of FIG. 3 wherein the speed control signal is plotted as the abscissa with the signal being expressed in PSI and engine speed is plotted as the ordinate and with a horizontal broken line 350, indicating maximum engine speed. If the governor 302 is normally set to provide a relatively low working speed, as indicated by a horizontal line section 351, it will be noted that at a certain value of the speed control signal, the engine speed can be caused to increase, as indicated by the line section 352, until the engine speed reaches the maximum at the line 350.

The speed control signal delivered to the hydrostatic transmission components is directly related to the flow of the pumps because of its use in setting the displacement controls for the pumps. Therefore, the speed control signal is a direct indication of the displacement setting of the pumps and can be used to control the engine speed in advance of the pumps reaching maximum displacement and to initiate control of engine speed at any predetermined level of the speed control signal.

Figure 4:
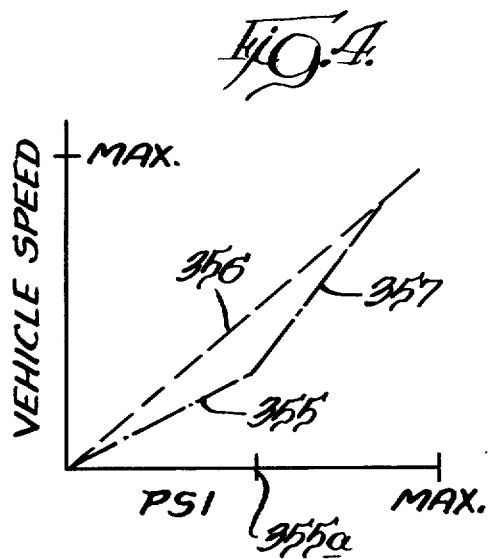
FIG. 4 is a graph showing the relation of the engine speed control to an operator-established vehicle speed demand.

The operation can also be analyzed by consideration of the graph shown in FIG. 4. The speed control signal is plotted as the abscissa and the vehicle speed is plotted as the ordinate. The sloped line 355 shows the gradually increasing vehicle speed when the operator's handle 310 has been set at a position to set the engine governor 302 to operate the engine at an intermediate speed and the speed control signal increases by adjustment of the speed control valve 80. When the engine is operating at maximum speed, then the vehicle speed increases, as indicated by line 356, as the speed control signal increases under control of the speed control valve 80. When operating along the line 355 and a speed control signal is set by the control valve 80 beyond a certain level indicated at 355a, the control motor 322 is operated to cause vehicle speed to increase along the line 357 of greater slope than the line 355 in response to further increase in the speed control signal until, at a certain value of the speed control signal, the engine is operating at full speed and the line 357 meets the maximum engine speed line 356.

The line 320 delivering the speed control signal to line 321 of the control circuit, similarly to the embodiment of FIG. 1, is one branch line of the control circuit and has a check valve 360 and with there being a second branch line 361 having a check valve 362 and which corresponds to the branch line 50 of the embodiment of FIG. 1 and which has a control valve therein responsive to the displacement of a pump supplying an implement circuit. The control motor 322 is responsive to either the speed control signal of the dual path hydrostatic transmission or a control signal from the implement circuit pump. The control circuit includes a line having an orifice 365 providing a flow-restricted path to tank for the same purpose as the flow-restricted line including orifice 56 in the embodiment of FIG. 1.

With the embodiment of FIG. 2, the engine can be set to operate at a speed less than maximum resulting in less noise, better fuel economy and longer component life. Whenever the speed demanded of the dual path hydrostatic transmission exceeds that available at the set speed of the engine or when the demands of the implement circuit exceed the available flow from the implement circuit pump, the speed of the engine is increased to meet the required demand up to maximum engine speed. The speed control signal applied to the pumps 70 and 72 of the hydrostatic transmissions inherently causes destroking of the motors 71 and 73 after the pumps 70 and 72 have reached full displacement and which is disclosed in said MacIntosh et al patent.

I claim:

1. An engine speed control for an engine which powers a hydrostatic transmission usable in the drive of a vehicle, said hydrostatic transmission having a variable displacement pump with a control servo for setting pump displacement, a control circuit including said control servo, speed command means in said control circuit for establishing a speed control signal applied to said control servo to set pump displacement for a desired output speed of the vehicle, operator control means operable independently of the speed command means for setting the speed of the engine, and a control motor in the control circuit operatively connected to the operator control means and operable responsive to the speed control signal which sets pump displacement to increase the speed of the engine when the speed control signal exceeds a predetermined value.

2. A control as defined in claim 1 including a variable displacement pump for an implement circuit, and means for detecting the displacement setting of said last-mentioned pump and operable on the control motor to increase the speed of the engine when the last-mentioned pump is near maximum displacement.

3. An engine speed control for an engine which powers a dual path hydrostatic transmission for driving a vehicle comprising, an engine having an adjustable governor for setting engine speed, an operator control for adjusting the governor to have the engine operate at a selected speed, a normally inactive control motor associated with said governor and selectively operable on the governor to increase engine speed when the engine is not at maximum speed, a pair of hydrostatic transmissions each including a variable displacement pump having a control servo to establish pump displacement, a vehicle speed control circuit for setting the value of a speed control signal applied to said control servos to set the displacement of the pumps, said control motor being in said control circuit to have said speed control signal applied thereto, and means associated with the control motor enabling operation of the control motor when the speed control signal which sets pump displacement reaches a certain value to increase engine speed if the engine is operating at less than maximum speed.

4. An engine speed control as defined in claim 3 wherein the control motor progressively increases engine speed as the speed control signal increases above said certain value.

* * * * *